United States Patent
Ferdowsi et al.

(10) Patent No.: US 9,049,176 B2
(45) Date of Patent: Jun. 2, 2015

(54) FILE SHARING VIA LINK GENERATION

(75) Inventors: Arash Ferdowsi, San Francisco, CA (US); Drew Houston, San Francisco, CA (US); Jonathan Ying, San Francisco, CA (US); Jeffrey Bartelma, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 13/217,944

(22) Filed: Aug. 25, 2011

(65) Prior Publication Data

US 2012/0331108 A1    Dec. 27, 2012

Related U.S. Application Data (63) Continuation of application No. PCT/US2011/041531, filed on Jun. 22, 2011.

(51) Int. Cl.
| | |
|---|---|
| *G06F 15/16* | (2006.01) |
| *H04L 29/08* | (2006.01) |
| *G06F 17/30* | (2006.01) |
| *G06F 3/06* | (2006.01) |
| *H04L 29/06* | (2006.01) |

(52) U.S. Cl.
CPC .......... *H04L 67/06* (2013.01); *G06F 17/30876* (2013.01); *H04L 67/1097* (2013.01); *H04L 63/10* (2013.01); *G06F 3/0622* (2013.01); *G06F 3/0661* (2013.01); *G06F 3/067* (2013.01)

(58) Field of Classification Search
None
See application file for complete search history.

(56) References Cited

U.S. PATENT DOCUMENTS

| | | |
|---|---|---|
| 6,684,212 B1 | 1/2004 | Day et al. |
| 6,687,741 B1 | 2/2004 | Ramaley et al. |
| 7,206,806 B2 † | 4/2007 | Pineau |
| 7,401,104 B2 * | 7/2008 | Shah et al. ............ 707/620 |
| 7,676,526 B1 | 3/2010 | Beloussov et al. |
| 7,734,690 B2 * | 6/2010 | Moromisato et al. ......... 709/204 |
| 7,756,892 B2 | 7/2010 | Levy |
| 8,065,424 B2 | 11/2011 | Foresti et al. |
| 8,140,506 B2 | 3/2012 | Pennington |
| 8,194,940 B1 | 6/2012 | Kiyohara et al. |
| 2003/0014477 A1 | 1/2003 | Oppenheimer et al. |
| 2003/0097410 A1 | 5/2003 | Atkins et al. |
| 2003/0120729 A1 * | 6/2003 | Kim et al. ............ 709/203 |
| 2003/0152904 A1 | 8/2003 | Doty, Jr. |
| 2003/0227487 A1 | 12/2003 | Hugh |
| 2004/0044746 A1 | 3/2004 | Matsusaka |
| 2005/0076030 A1 | 4/2005 | Hada et al. |
| 2005/0091289 A1 | 4/2005 | Shappell et al. |
| 2005/0240428 A1 | 10/2005 | Gabrick et al. |
| 2006/0095514 A1 * | 5/2006 | Wang et al. ............ 709/204 |
| 2006/0133407 A1 | 6/2006 | Kuisma |
| 2006/0230030 A1 | 10/2006 | Volpa et al. |
| 2007/0016613 A1 | 1/2007 | Foresti et al. |

(Continued)

OTHER PUBLICATIONS

PCT International Search Report and Written Opinion, PCT Application No. PCT/US2011/041531, Apr. 6, 2012, 8 pages.

*Primary Examiner* — John B Walsh
(74) *Attorney, Agent, or Firm* — Fenwick & West LLP (57) ABSTRACT

Users specify that a file set comprising their files, folders, or other content owned by the users should be made accessible via a link, such as a uniform resource locator (URL). The system which stores and provides access to the files accordingly creates a link that specifies the file set to be made accessible. The users may distribute the link to recipients with whom the file set is to be shared, and the distribution may be performed in any manner that the users choose.

22 Claims, 10 Drawing Sheets

(56) References Cited

U.S. PATENT DOCUMENTS

| | | |
|---|---|---|
| 2007/0174341 A1 | 7/2007 | Saripalli et al. |
| 2007/0203917 A1 | 8/2007 | Du et al. |
| 2007/0214169 A1 | 9/2007 | Audet et al. |
| 2007/0239760 A1 | 10/2007 | Simon |
| 2007/0260747 A1 | 11/2007 | Samzelius et al. |
| 2008/0216139 A1* | 9/2008 | Liwerant et al. ............. 725/113 |
| 2009/0216569 A1 | 8/2009 | Bonev et al. |
| 2009/0287715 A1 | 11/2009 | Chi et al. |
| 2010/0185698 A1 | 7/2010 | Lee et al. |
| 2010/0211998 A1* | 8/2010 | Soelberg et al. ................ 726/4 |
| 2010/0274864 A1 | 10/2010 | Jalili |
| 2011/0137986 A1 | 6/2011 | Wolf |
| 2011/0154456 A1 | 6/2011 | Machani |
| 2011/0167159 A1 | 7/2011 | Bethlehem et al. |
| 2011/0264532 A1* | 10/2011 | Chan et al. .................. 705/14.66 |
| 2011/0276638 A1 | 11/2011 | Errico et al. |
| 2011/0287748 A1 | 11/2011 | Angel et al. |
| 2012/0151002 A1 | 6/2012 | Lin et al. |
| 2012/0197980 A1 | 8/2012 | Terleski et al. |
| 2012/0209892 A1 | 8/2012 | MacAskill et al. |
| 2012/0278404 A1* | 11/2012 | Meisels et al. ................ 709/206 |
| 2012/0290686 A1 | 11/2012 | Anchan et al. |
| 2012/0324121 A1 | 12/2012 | Carr et al. |
| 2013/0013561 A1 | 1/2013 | Chan et al. |
| 2013/0174272 A1 | 7/2013 | Chevalier et al. |

\* cited by examiner

† cited by third party

FIG. 4

FILE SHARING VIA LINK GENERATION

CROSS-REFERENCE TO RELATED APPLICATIONS

This application is a continuation of PCT application PCT/US2011/041531, filed on Jun. 22, 2011, which is incorporated herein by reference in its entirety.

TECHNICAL FIELD

The disclosed embodiments relate generally to sharing of data over a network. In particular, the disclosed embodiments are directed to sharing of user files via user-generated links.

BACKGROUND

It is now common for an individual to regularly use multiple computers from multiple different locations. A typical user may have a first computer at the office and a second computer at home, for example, as well as a portable computer, and a web-enabled mobile device such as a smartphone. To have ready access to the user's content, it is desirable for the user to share his files between these multiple computers.

One way to share files between these multiple computers is to manually transfer the files from one to the other—for example, a user may e-mail himself a copy of a file he is working on before leaving the office, so that he can resume working on it later from home. If the user forgets to e-mail or bring the file home with him, he must either go back to the office to retrieve it, or perhaps simply wait until the next day. Alternatively the user can attempt to remotely access to his work computer, for example using a virtual private network (VPN) to access a corporate network from a remote location, but only if such access is authorized. However, if the user is accessing the document remotely and loses his connection, he may lose his changes, be unable to continue, and may end up with a corrupted document.

Another attempt to solve this problem has involved the use of network storage devices, whereby services offer users the opportunity to store their documents "in the cloud"—that is, on servers accessible to users via the Internet or other network. In the above example, a user who is interested in working on a document from multiple locations can store the document on a network file server and then edit it from home, work, or any other location that provides network access to the file server.

SUMMARY

A file access server enables a user to obtain a URL or other resource identifier (generally, a "link") that can be shared with others, and which provides access to one or more files or file folders (generally, a "file set") managed by the user and stored on a network storage device operated by a file access service. The file access server generates the link and associates it with the file set specified by the user as part of the request. To generate the link, the file access server determines an identifier for file set that is to be referenced and creates a unique link mapped internally by the file access server to the referenced file set. In one embodiment, the link is opaque, such that it is impossible for a person not in possession of the link to determine the associated files or folders by inspection only, or to guess the link that provides access to a given file set. In other embodiments, the link contains a name of the files or folders in the associated file set.

In some embodiments, the links may be associated with other links, thus allowing multiple levels of indirection, and they may specify an application or plug-in used to view or otherwise interact with the associated file set.

The user may distribute the link to one or more recipients, who access the shared file set by following the link. The distribution of the link by the user can be by e-mail, text, or social media service, such that the user can target a narrow or a wide audience.

The request from the user to create the link can be accomplished in multiple ways. For example, a user can use a web-based interface to the file access service, or a local client program coupled to the file access service, such as a file browser on a desktop computer or a file viewer on a handheld device, to create a link to the selected file set.

In one embodiment, the server itself facilitates distributing the link, such as by providing a mechanism for posting the link to a social networking service or to a microblogging service. Alternatively, the user distributes the link without further use of the server, such as by emailing the link to a mailing list, by posting the link on a web site, or the like.

In one embodiment, the server provides to the user a list of links that he has previously created. The user can revoke access to the shared files or other content simply by disabling or deleting the links.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

Figure 1:
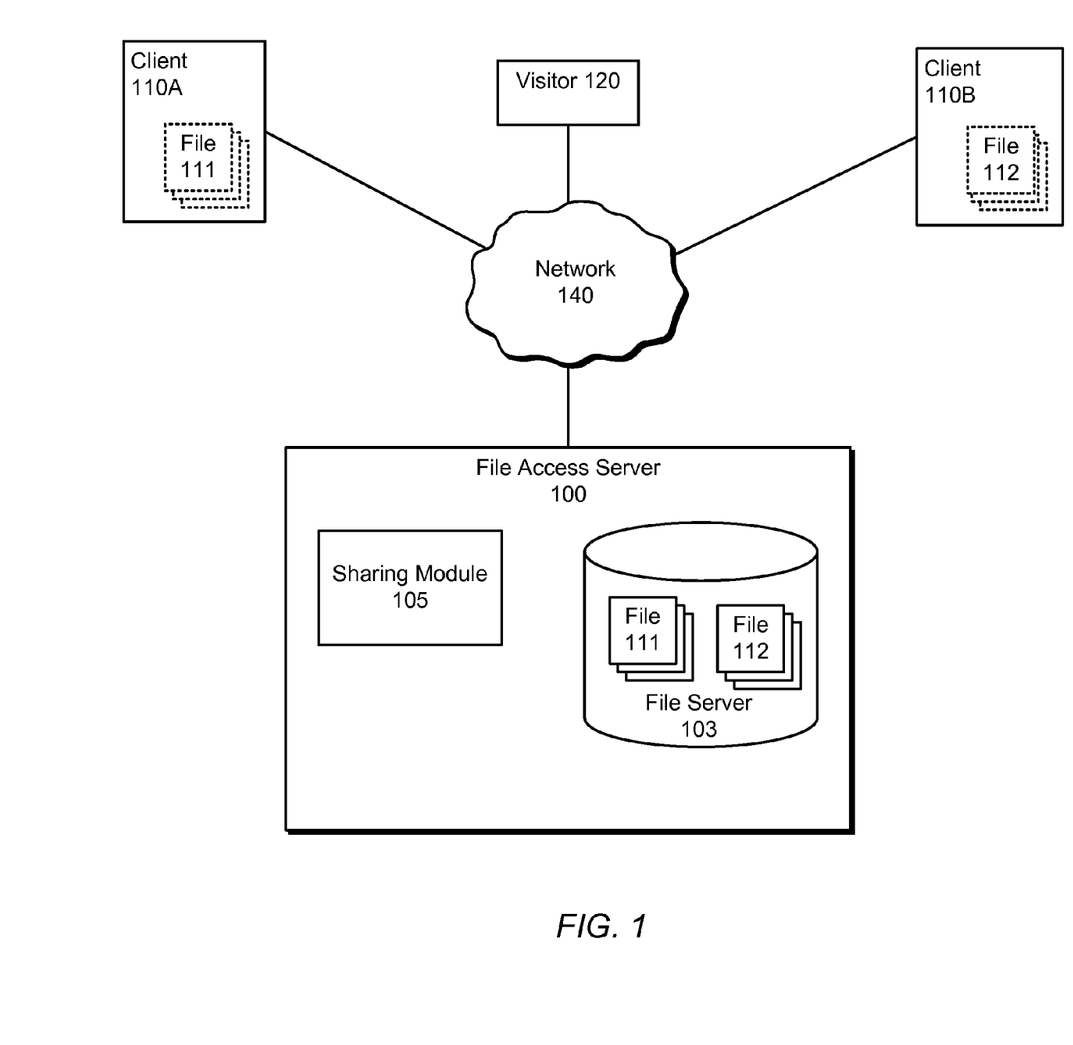
FIG. 1 is a block diagram of an environment in which sharing can be performed, according to one embodiment.

FIG. 1 illustrates a file access server 100 in accordance with one embodiment. File access server 100 includes a sharing module 105 and file server 103. Sharing module 105 provides functionality for sharable file links as described below. File server 103 provides network file storage for clients 110A and 110B of a file access service that includes file access server 100. For example, a first client 110A may store one or more files 111 on file server 103; a second client 110B may store one or more files 112 on file server 103. In some embodiments, software executing on the client 110 integrates the network-stored files with the client's local file system to enable a user to manipulate the network-stored files through the same user interface (UI) as is used to manipulate files on the local file system, e.g., via a file explorer. In FIG. 1, file sets 111 and 112 are illustrated within clients 110A and 110B with dotted lines to illustrate this integration; the files in the set are understood to reside on file server 103. Note that in some embodiments, clients 110 may additionally maintain a cache of the file sets stored on the network file server 103, to improve speed and reliability. Those of skill in the art will recognize that various methods exist to maintain synchronization between local and network based files. In other embodiments, clients 110 access file sets via a web interface, or through a custom-designed client installed on a client device. Devices might include, for example, a desktop or laptop computer, a tablet computing device, or a handheld computing device such as a personal digital assistant or a smart phone (e.g., an IPHONE or BLACKBERRY, or a SYMBIAN or ANDROID-based smart phone). One provider of a suitable file access service is Dropbox Inc., of San Francisco, Calif.

FIG. 1 illustrates only two clients, 110A and 110B, for purposes of clarity. When implemented, file access server 100 may be in communication with thousands or millions of clients, and each client may store one or multiple files on file access server 100. When represented to the user, the files may be arranged in folders; and folders themselves may be arranged in other folders, as determined by the user; however the underlying storage architecture may be considerably different, and implemented to maximize storage efficiency, and without necessarily mirroring each user's file hierarchy. File access server 100 and its components may be implemented using any appropriate hardware for performing file serving and storage—solely for clarity of illustration and description, FIG. 1 illustrates only a single file access server, and one instance of relevant file stores and modules. Additionally, many components required for operation of a file access server and service, known to those of skill in the art but not germane to this description—for example, network cards, CPUs, memory, and the like—are omitted for clarity.

FIG. 1 also illustrates a visitor 120, to whom a sharable link can be provided. As described further below, a visitor 120 need not have client software installed, and need not be a user of file access server 100, in order to access files via a shared link.

Network 140 represents the communication pathways between the client devices 110 and the file access server 100. In one embodiment, the network 140 uses standard Internet communications technologies and/or protocols. Thus, the network 140 can include links using technologies such as Ethernet, IEEE 802.11, IEEE 806.16, WiMAX, 3GPP LTE, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Clients 110 add files to file server 103 either through a manual upload process, or by synchronization with the local file system. In the embodiment using synchronization, each client 110 executes a synchronization client application through which files 111 of that client are specified for synchronization. The synchronization client application then provides the specified files to the file access server 100. The specified files 111 are then provided to other ones of the clients 110, either by "push" in which the file access server 100 provides the files to the clients associated with a user who provided the files, or by "pull" in which the clients request the files from the file access server. The synchronization client applications and the file access server 100 also ensure that changes to the synchronized files are likewise reflected across all associated clients 110.

In one embodiment, the synchronization client applications use local peer-to-peer synchronization for greater efficiency and do not require use of the file access server 100. For example, devices associated with the same user or having access to the same shared folder can determine whether they are on the same local area network, and if so establish a secure connection (e.g., via SSL) and effect synchronization through peer-to-peer transfer of files.

The synchronized files are typically provided only to clients 110 associated with a user who provided the files. For example, if a particular user registers his desktop, laptop, and handheld device with the file access server 100 as his client devices 110, then the file access server and the synchronization applications on those three devices will synchronize the files with those devices and otherwise make the file available to the user via the user's login (e.g., via a web-based interface). However, the file access server 100 will not by default make the files available to devices of other users or via logins other than that of the user who provided the files.

Thus, the file access server 100 comprises a sharing module 105 that provides links and enables file access by users other than those who initially provided the files. The sharing module 105 is described further below with respect to FIG. 2.

Figure 2:
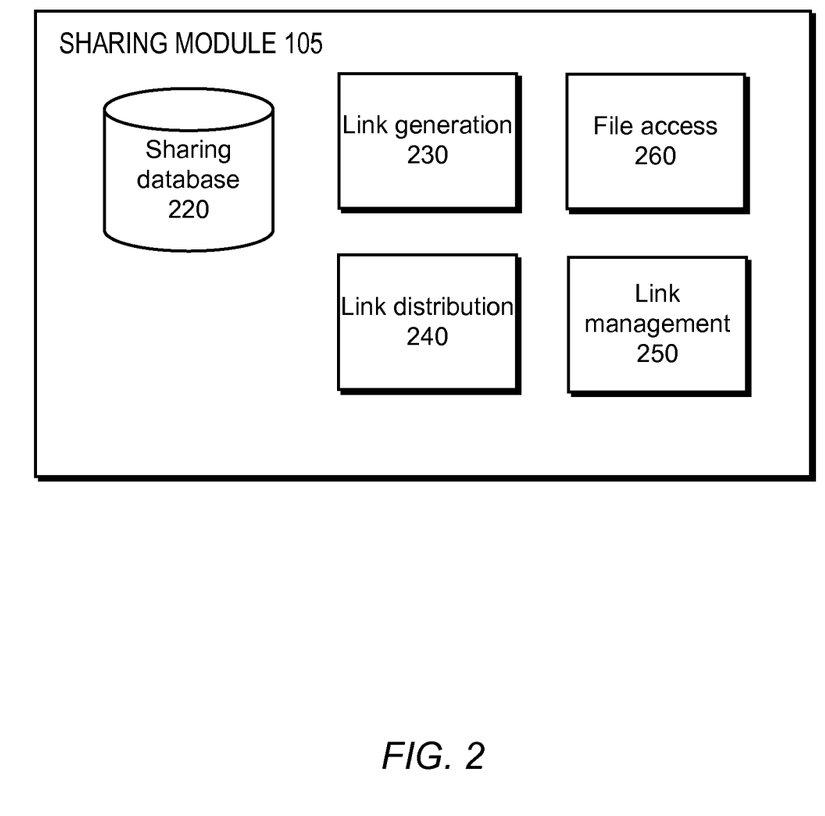
FIG. 2 is a block diagram illustrating the components of the file access server of FIG. 1, according to one embodiment.

FIG. 2 is a block diagram illustrating the components of the sharing module 105 of FIG. 1, according to one embodiment. The sharing module 105 enables access to a user's specified file sets through the use of a shared link.

Sharing module 105 comprises a sharing database 220 specifying sets of files to be shared and the links used to share them. The sharing module 105 further comprises a link generation module 230 for generating links and specifying corresponding file sets to be shared, a link distribution module 240 for facilitating distribution of the links to other users, a link management module 250 for viewing and removing previously generated links, and a file access module 260 for accessing the files via the generated links.

The sharing database 220 specifies sets of files to be shared and a mapping between the shared files and the links used to reference them. For example, the sharing database might comprise a set of pairs, each pair mapping a particular file set to a unique link (e.g., a URL) by which the file set can be accessed.

The link generation module 230 generates a link corresponding to the file set specified by the user requesting the sharing. The file set to which the link corresponds may include a single file or a set of files, or a container of files such as one or more folders, or even particular logical content such as a particular time sequence of a video file, particular slides of a presentation file, or particular records from a database constructed from multiple files.

The link unambiguously identifies within sharing module 105 the file set to which it corresponds. In one embodiment, upon receiving a request to share a particular file set via a link, the link generation module 230 generates a file set descriptor unambiguously describing the file set to be shared and a unique URL that serves as the link, and then saves an association of the file set descriptor and the URL in the sharing database 220. In one embodiment, the generated link is independent of the file set descriptor, such that the file set descriptor cannot be inferred from the link, and vice versa. This prevents malfeasance by making it essentially impossible to guess a sharable link if it is not already known. As an example, when sharing a folder "JuneDocs" with a file ID of 3D8B99, the link generation module 230 might generate the unique (e.g., one way pad, or a pseudo-random value) URL https://www.service.com/s/28rtiz608u2 nm co/newdoc.pdf, where the URL component 28rtiz608u2 nm co cannot be reverse-engineered, and accordingly create an entry <3D8B99, https://www.service.com/s/28rtiz608u2 nm co/newdoc.pdf> in the sharing database 220. In one embodiment, the generated link can further be shortened. Referring to the prior example, the generated URL https://www.service.com/s/28rtiz608u2 nm co/newdoc.pdf can be shortened by a link-shortening service, located either on the file access service 100 or on some remote third party system, to the shorter URL http://db.tt/xOFounw, and an additional association between the generated link and the shortened link added to the sharing database 220. In another embodiment, the file set can be directly associated with a shortened link, rather than with an intermediate, longer generated link such as that described above. In various embodiments, the user can select a combination of a single file, multiple files within a folder, multiple folders, and multiple files across multiple folders as the file set to be associated with the single shared link.

In one embodiment, a user can generate multiple different links to the same file set. Thus, the user can more selectively control access to the file set by distributing different ones of the multiple different links to different sets of people, revoking access to the file set (if needed) via certain ones of the links while maintaining access via the other links. In another embodiment, an attempt to obtain a link to a file set for which a link has already been generated results in providing the same link that was originally generated.

In one embodiment, a user may specify a particular application or plug-in with which the file set should be viewed or otherwise interacted with. For example, an identifier that uniquely identifies an application or plug-in can be embedded within the generated link. As a more concrete example, the generated link for a given file set could be the URL https://www.service.com?app=1ps3q/s/28rtiz608u2 nm co/newdoc.pdf, which specifies (via the portion "app=1ps3q") that some application uniquely associated with the identifier "ips3q" should be used to view the file set. Alternatively, the association between the link and the application or plug-in can be made in the sharing database 220 itself, rather than being embedded in the link. For example, a user could generate a first link to a file set that specifies use of a first application for viewing the file set, and a second link that specifies use of a second application, and the sharing database 220 would in turn then contain two corresponding entries: <file set identifier, first link identifier, first application identifier>, and <file set identifier, second link identifier, second application identifier>. In another embodiment, the sharing module 105 itself selects the proper applications or plug-ins to use, e.g., based on the types of the files in the file set.

In one embodiment, links can be associated with other links so as to create a chain of links. For example, a first generated link associated with a file set can in turn be automatically associated with a shortened link, as discussed above. Further, users can explicitly specify multiple degrees of link associations. For example, a user could request generation of a first link to a given file set, and then request generation of one or more secondary links that are associated with the first link.

Figure 3A:
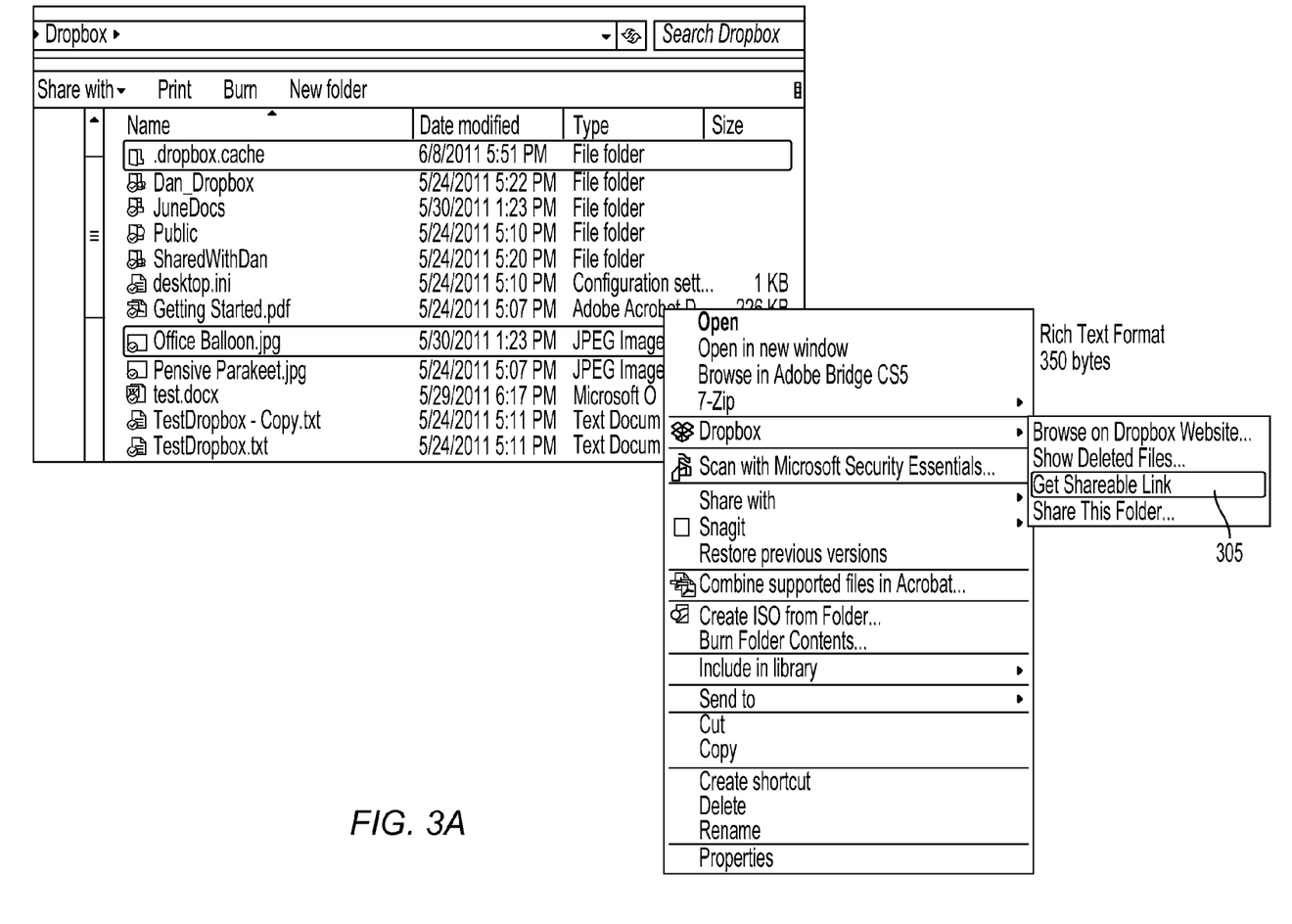
FIGS. 3A-3C are user interface diagrams illustrating different user interfaces for specifying the creation of a link for file set sharing, according to different embodiments.
Figure 3B:
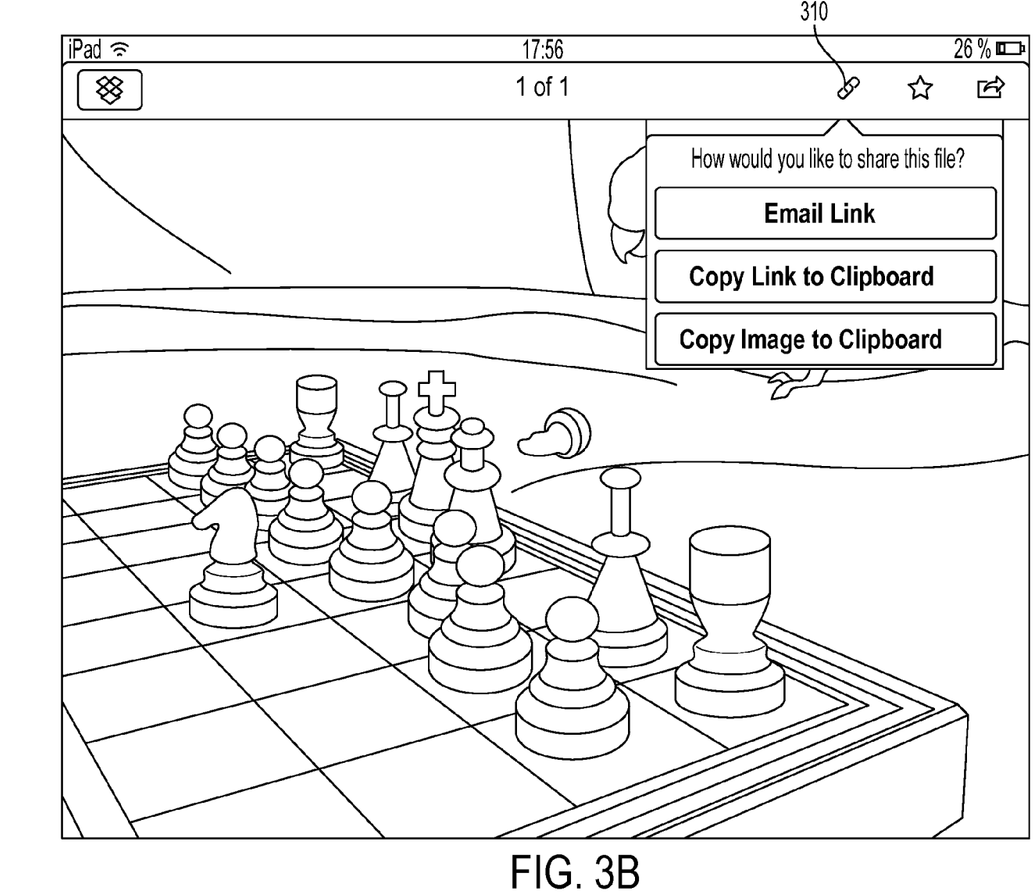
Figure 3C:
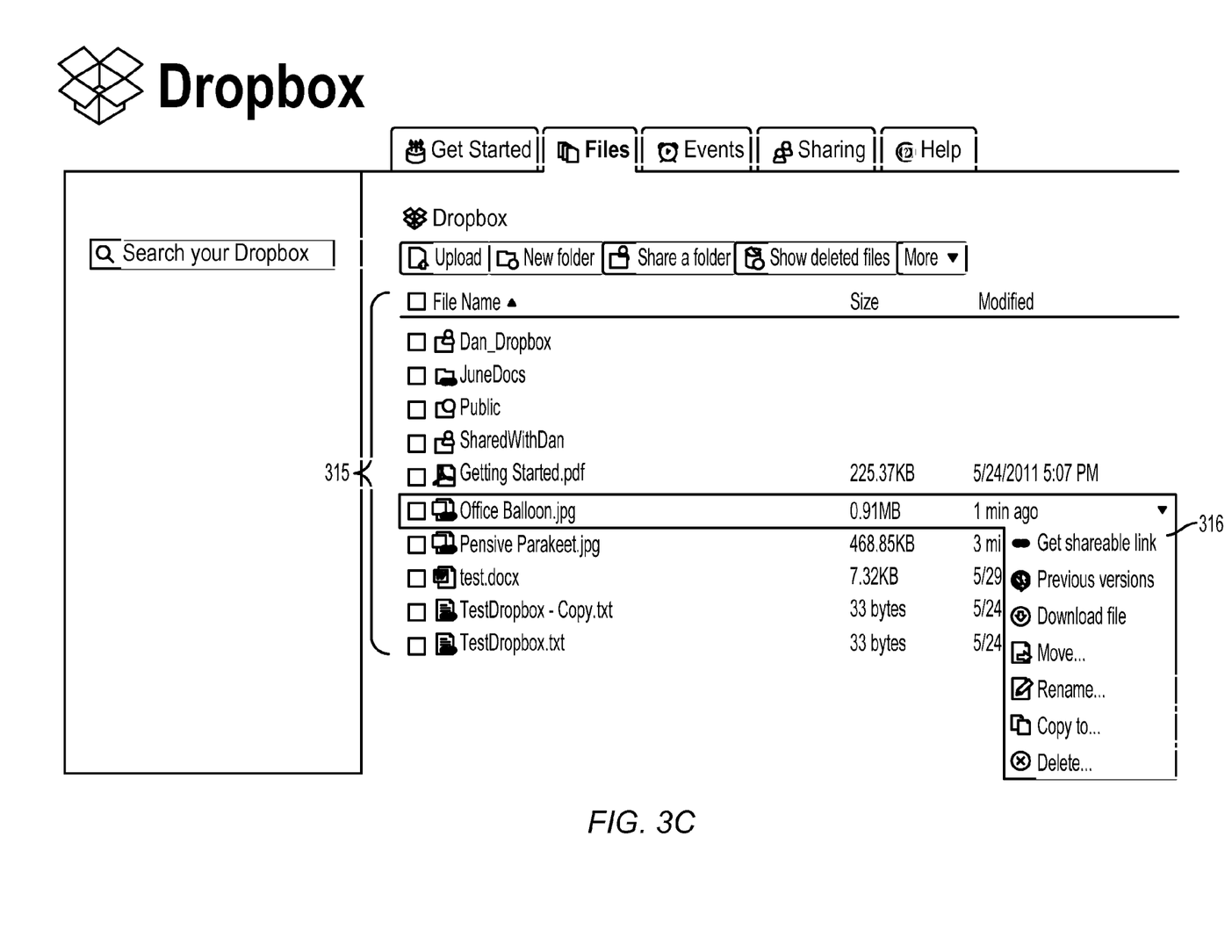

The user request that causes the link generation module 230 to generate a link can be specified in different manners in different embodiments. For example, the request can be made using the user interface provided by the client synchronization applications running on the clients 110, such as by designating a file within a file browser application and choosing a "Get shareable link" option 305 from a resulting context-sensitive menu, as depicted in FIG. 3A, or by clicking a link icon 310 within a file viewing application on a handheld device, as depicted in FIG. 3B. As another example, the request can be made from a web-based interface provided by the file access server 100, such as that depicted in FIG. 3C, in which the interface includes a web-based listing of files 316 stored on the file access server 100 and a "Get shareable link" menu item 316 associated with the various files.

Figure 3D:
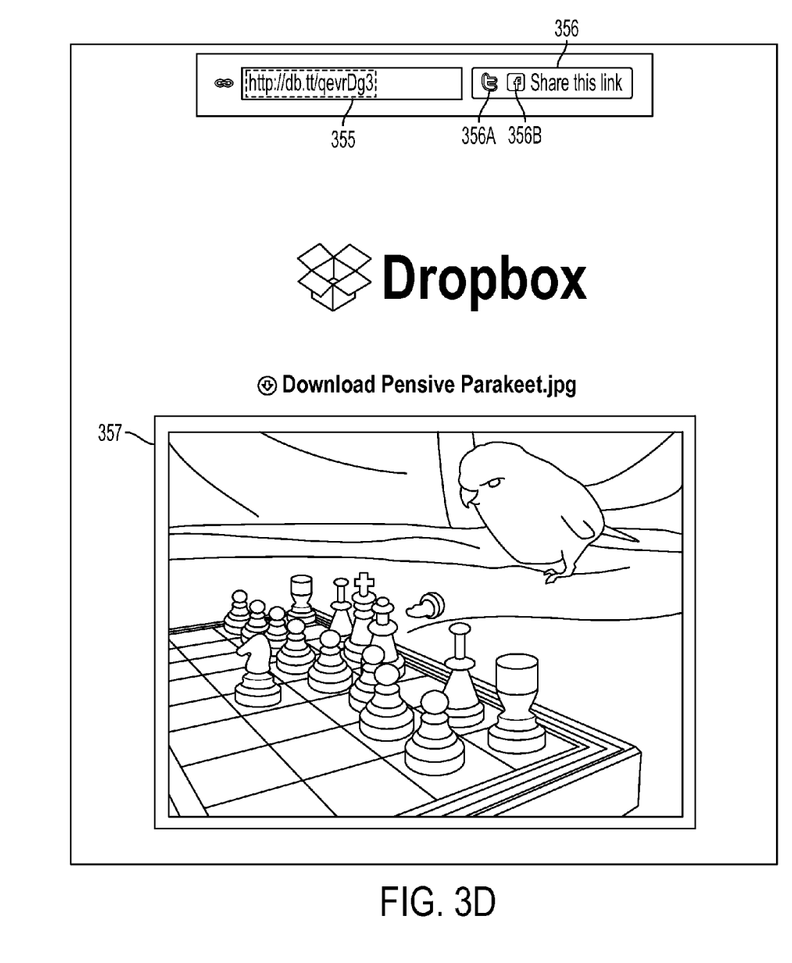
FIG. 3D is a user interface diagram illustrating a representation of a shared file.

In one embodiment, the sharing module 105 provides a web-based user interface displaying the generated link, such as the interface depicted in FIG. 3D. Specifically, in FIG. 3D the text field 355 displays the link generated for sharing an image file, a representation of which is shown in viewing area 357. Further, a sharing options area 356 provides options for distributing the generated link, e.g., via social networks.

The link distribution module 240 of FIG. 2 facilitates distribution of the links to users other than the users on behalf of whom the links were generated. For example, referring again to FIG. 3D, the options area 356 includes an option 356A for distributing the generated link via a microblogging service, and another option 356B for distributing the generated link via a social networking service. Selection of either option prompts the user for the user's login information for the selected service. Assuming that correct login information is provided, the link distribution module 240 then uses an API of the selected service to disseminate the link via the service, such as adding it as a post to a user's page on the social networking service, or sending it as part of a textual message on the microblogging service. Those to whom to link is provided may in turn provide the link to others, thereby further disseminating the sharing of the associated file set.

Figure 3E:
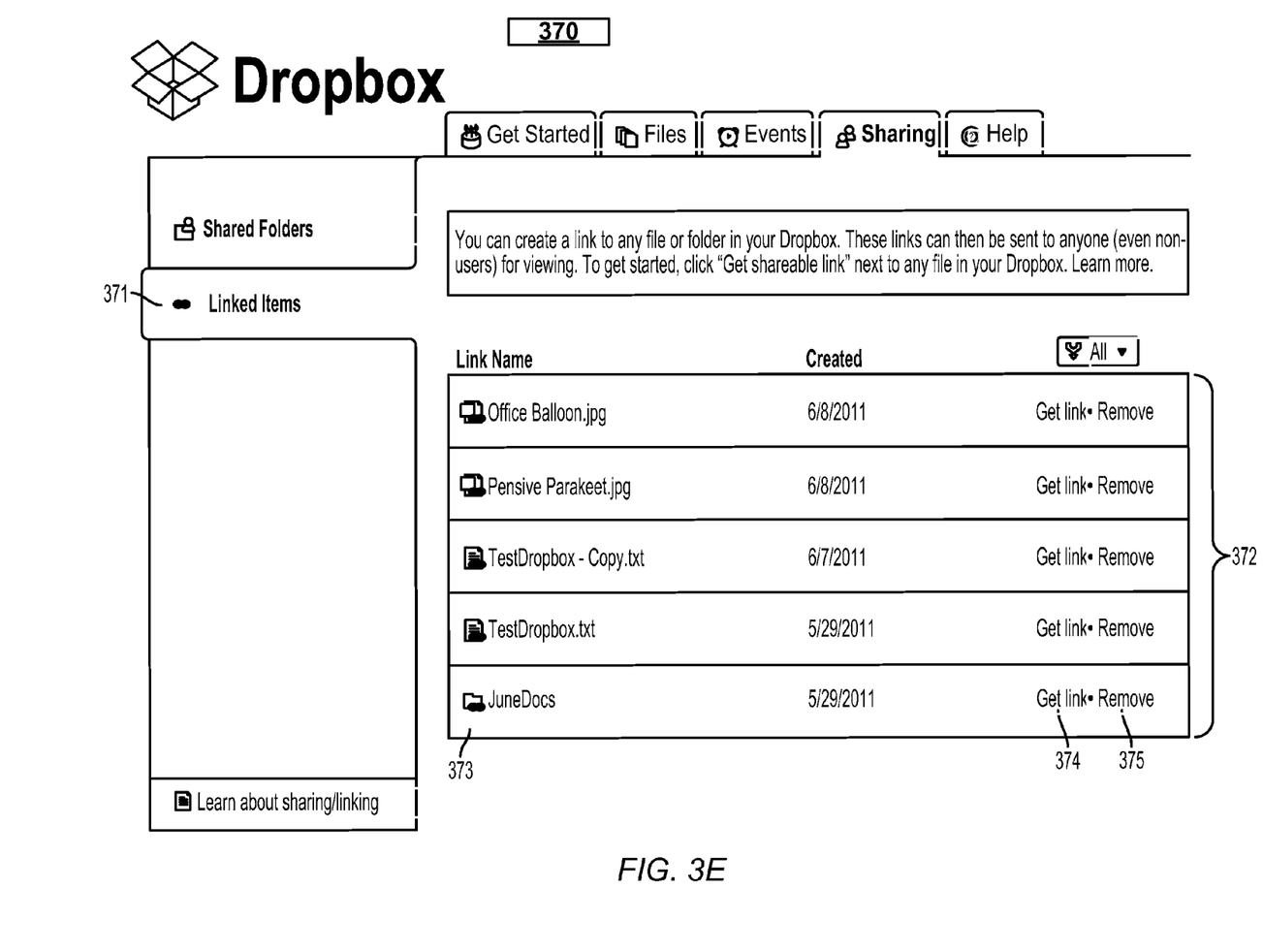
FIG. 3E is a user interface diagram illustrating a link management user interface.

The link management module 250 permits a user to manage the links that he or she has previously generated. For example, a user selecting the "Linked Items" portion 371 of a user interface 370 of FIG. 3E causes the link management module 250 to query the sharing database 220 for all the links that have been generated for that user and to display a list of the links in the list area 372. Each link has associated "Get link" and "Remove" actions 374, 375. The "Get link" action 374 displays the text of the link (e.g., URL) for dissemination by the user, as in text field 355 of FIG. 3D. The "Remove" action 375 revokes access to other users via that link, such as by deleting the entry for that link from the sharing database 220. Thus, no matter how large the set of users that have obtained the link—and thus access to the corresponding file set—the user that created the link can quickly and easily revoke the access simply by removing the link.

The file access module 260 provides the shared file set and/or representations thereof to clients 110 in response to requests made via the generated link. For example, assume that a first user of the client 110A of FIG. 1 generated a shortened link http://db.tt/xOFounw to a folder named "JuneDocs" with an ID of 3D8B99 and shared the link with a second user of the client 110B, such as by sending the link to an email account of the second user or posting the link to a social networking service accessible to the second user. When the second user clicks on or otherwise selects the link via the email or social networking service, a browser application on the client 110B sends a corresponding request to the sharing module 105. For the example in which the link is the URL http://db.tt/xOFounw, the browser sends an HTTP request to the host db.tt, which is a domain name of the file access server 100, including the parameter xOFounw. The request is handled by the file access module 260, which locates the entry in the sharing database 220 corresponding to the parameter and extracts the associated file set ID (namely, 3D8B99). Alternatively, if the folder is associated with a longer link https://www.service.com/s/28rtiz608u2 nm co/newdoc.pdf, and this longer link is in turn associated with a shorter link http://db.tt/xOFounw, then the file access module first obtains the longer link from the shortened link using the link shortening service used to create the shortened link, and then determines the file set from the longer link and the sharing database 220. (If the link has been removed, e.g. via the "Remove" action 375 of FIG. 3E, the sharing database 220 will not contain an entry for that link. Thus, the file access module 260 will accordingly prevent access to the file set by informing the user requesting the access to the file set that the file set is not available.)

The file access module 260 then displays a representation of the file set corresponding to the file set ID. For example, referring again to FIG. 3D, which represents the sharing of a single image file, the viewing area 357 displays a representation of the file—namely, a thumbnail view. In one embodiment, the entity that receives and accesses the shared link may be a visitor 120, i.e., not a registered user of file access server 100.

In one embodiment, the file access module 260 displays the representation of the file set using an application or plug-in corresponding to a unique identifier embedded within, or otherwise associated with, the generated link, as discussed above. In one embodiment, if the entity accessing the shared resources by shared link is a registered user of file access server 100, the user has an option of copying the shared files to her own file space on file server 103. FIG. 3G illustrates a user interface control 356C that enables the user to make such a copy. Note that in one embodiment the copy is a static copy, such that if the original sharing user makes subsequent changes to the shared file, the changes are not reflected in the version of the file copied by the user with whom the link was shared.

Figure 3F:
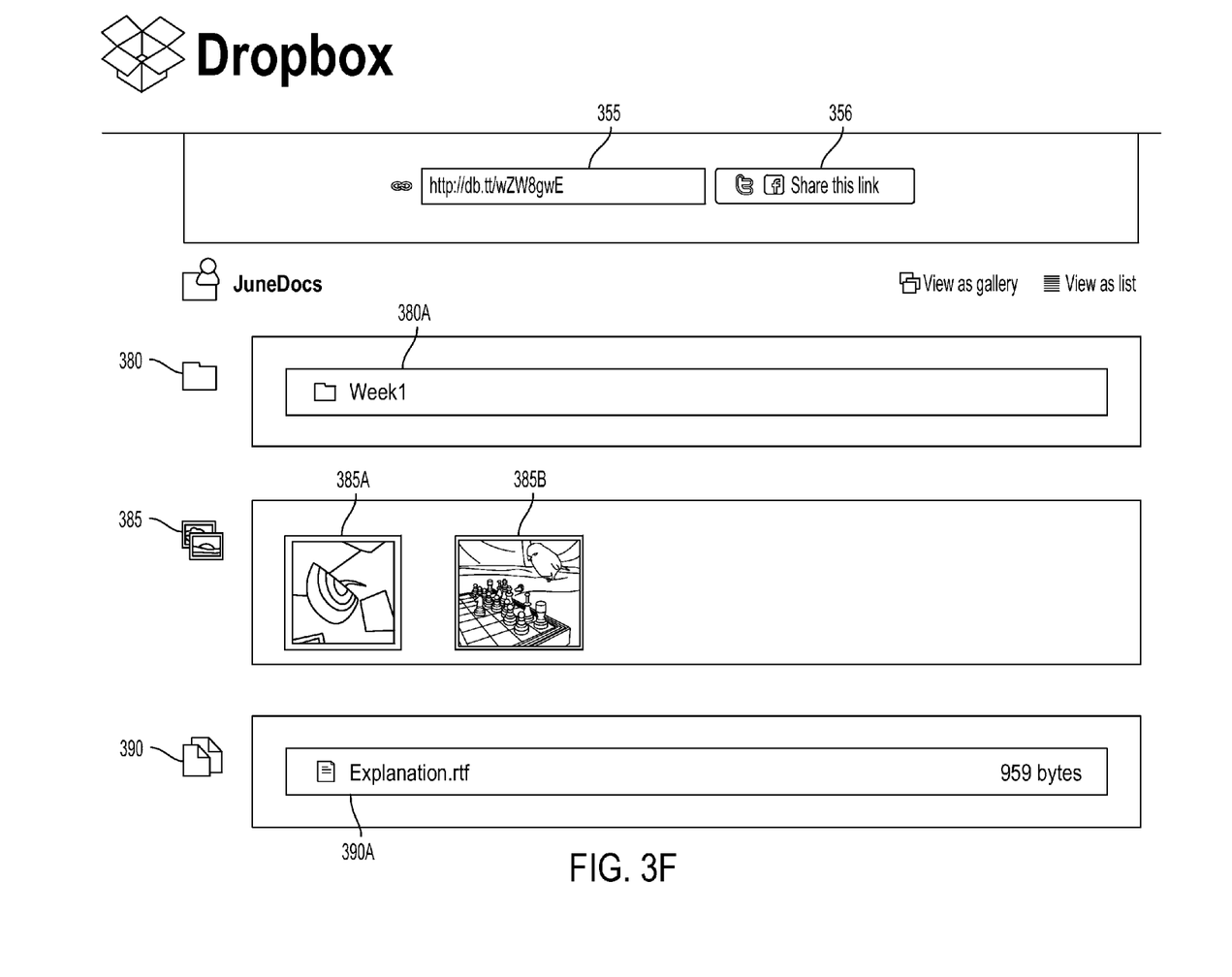
FIG. 3F is a user interface diagram illustrating a representation of a shared folder.
Figure 3G:
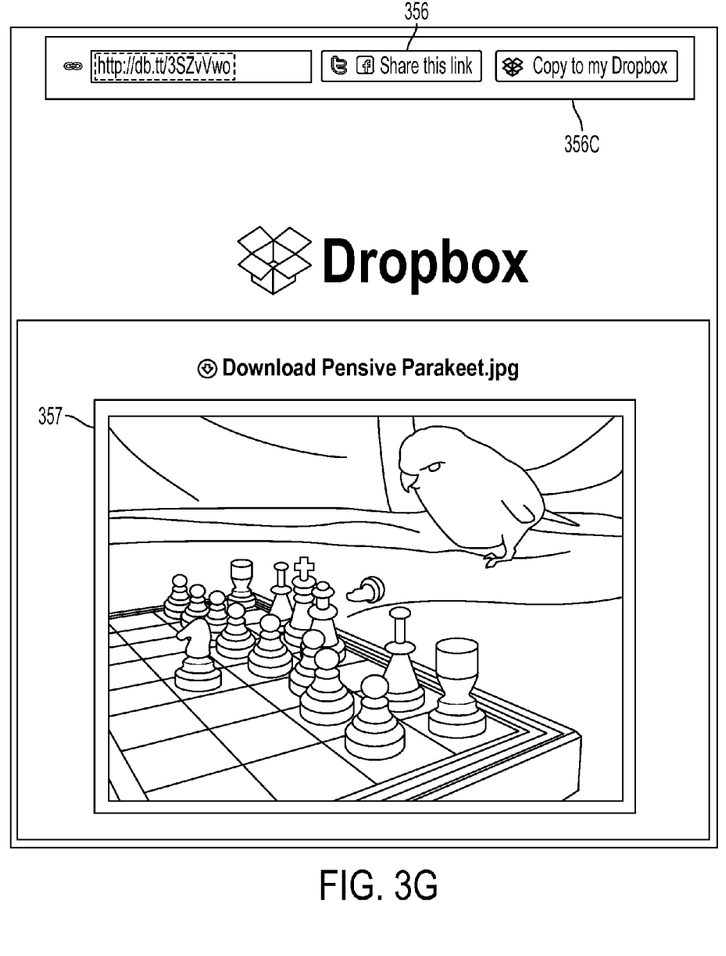
FIG. 3G illustrates a user interface control that enables a user to make a local copy of a shared file.

FIG. 3F represents the sharing of a folder named "JuneDocs". The text field 355 again contains a URL link by which the folder is shared, and the sharing options area 356 provides options for distributing the link. Each distinct type of file within the folder is displayed within one of the separate groups 380, 385, 390. The type may be determined in various ways, such as a file extension or other file metadata, or the content of the file itself. For example, group 380 includes the subfolders of the "JuneDocs" folder, group 385 includes the two image files that are within the folder, and group 390 includes a textual document 390A.

Each file (including folders) in the "JuneDocs" folder has an associated preview representation—namely, previews 380A, 385A, 385B, and 390A. The form of the preview may be specific to the type of the associated file, such as an image of a folder and the associated folder name for folders 380, image thumbnails for the images 385, and a document icon and an associated document name for the textual documents 390. Selecting one of the preview representations causes the corresponding file to be displayed. For example, selecting a preview representation of a folder displays the contents of the folder, and selecting a preview representation of an image obtains a copy of the entire corresponding file, e.g., displaying the image at full size within a browser window or saving the original file to local file system on the client 110.

In one embodiment, in order to reduce storage requirements for the file access server 100, the document preview for a file is generated on demand the first time that the file is viewed, as opposed to being generated when the file is first stored in the file repository 210.

Figure 4:
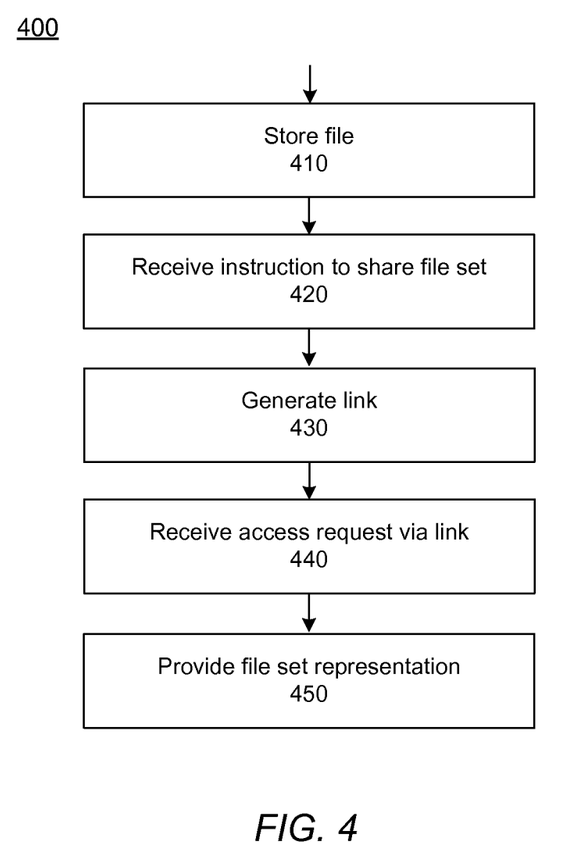
FIG. 4 is a flowchart illustrating the actions involved in creating a link to files or other content and accessing that content via the link, according to one embodiment.

FIG. 4 is a flowchart illustrating the actions involved in creating a link to files or other content and accessing that content via the link, according to one embodiment.

The file access server 100 stores 410 a file within the file repository 210. As discussed above, the file could be manually uploaded by one of the clients 110, or it could be stored as a result of file synchronization resulting from coordination of the file access server 100 and synchronization client applications installed on the clients 110, for example.

The sharing module 105 receives 420 an instruction from a user of a client 110 to share a particular file set that includes the stored file, such as one or more individual files, one or more folders of files, or meaningful portions of files or other content. The request might be, for example, the result of one of the user interface actions depicted in FIGS. 3A-3C.

Responsive to receiving the request, the sharing module 105 generates 430 a link specifying the file set, as discussed above with respect to the link generation module 230. The link may then be displayed to the user via a user interface such as that of FIG. 3D or 3F. A user may manually distribute the link to others with whom the associated file is to be shared, or may use the optional link distribution module 240 to facilitate the distribution.

The sharing module 105 receives 440, from a second client (e.g., client 110B of FIG. 1) located remotely from the first client (e.g., client 110A) that made the request to share the file set, an access request via the link. The file access module 260 then provides 450 a representation of the file set, as described above.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

It should be noted that the process steps and instructions can be embodied in software, firmware or hardware, and when embodied in software, can be downloaded to reside on and be operated from different platforms used by a variety of operating systems.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method executed by a file access server, comprising:
   receiving a request from a user of a first client located remotely from the file access server in response to the user selecting a user interface element representing a request for a link providing access to a server folder, the server folder stored on the server and containing a first plurality of files;
   responsive to receiving the request, generating a link specifying the server folder providing the link to the first client for distribution by the user to other clients;
   receiving, from a second client located remotely from the first client, a first access request via the link;
   responsive to receiving the first access request, providing a first representation of the server folder to the second client, the first representation including the first plurality of files;
   receiving, by the file access server from the first client, a request to synchronize with the server folder a set of client files stored in a client folder, the set of client files including a plurality of new client files not stored in the server folder;
   synchronizing, by the file access server, the server folder with the client folder, the synchronizing comprising creating a plurality of new server files in the server folder that correspond to the plurality of new client files;
   receiving, from the second client, after the synchronizing, a second access request via the link; and
   responsive to receiving the second access request, providing a second representation of the server folder to the second client, the second representation including the plurality of new server files, the first representation omitting the plurality of new server files.

2. The computer-implemented method of claim 1, wherein providing a representation of the server folder comprises providing a set of representations of files in the server folder, the representations being arranged according to file type.

3. The computer-implemented method of claim 1, wherein the user interface element is a menu item within a file browser application of the first client, and wherein selecting the user interface element comprises selecting the menu item within a menu of the file browser application.

4. The computer-implemented method of claim 1, further comprising providing to the first client a web-based listing of files stored on the server, wherein the request for the link providing access to the server folder is specified using the web-based listing of the files in the server folder.

5. The computer-implemented method of claim 1, further comprising:
   determining that the second client of a second user has been registered to the second user on the file access server;
   receiving from the second client a request of the second user to obtain a separate copy of the server folder;
   responsive to determining that the second client of the second user has been registered to the second user on the file access server, creating a copy of the server folder to an account of the second user on the file access server.

6. The computer-implemented method of claim 1, further comprising:
   receiving, from the first client, a request for a list of links that have been generated by the user; and
   providing the first client with the list of links.

7. The computer-implemented method of claim 1, further comprising:
   responsive to receiving from the first client a request to remove the link, removing the link;
   receiving a third access request from the second client via the link; and
   responsive to the removing of the link, denying access to the server folder.

8. The computer-implemented method of claim 1, further comprising:
   receiving a second request from the first client for a link providing access to the server folder;
   responsive to receiving the second request, generating a second link specifying the server folder;
   distributing the link to a first group of users and the second link to a second group of users different from the first group of users;
   responsive to receiving from the first client a request to remove the link, removing the link; and
   after removing the link:
      denying access to the server folder via the link to members of the first group; and
      permitting access to the server folder via the second link to members of the second group.

9. The computer-implemented method of claim 1, further comprising:
   providing to the first client a user interface comprising a user interface element representing transmitting the link to a social networking service; and
   responsive to selection of the user interface element, transmitting the link for sharing with a user of the second client via the social networking service using an API of the social networking service.

10. The computer-implemented method of claim 1, wherein:
   generating the link specifying the server folder comprises creating, in a sharing database, an association between the link and an identifier of the server folder; and
   providing a representation of the server folder to the second client comprises using the sharing database to identify the server folder associated with the link.

11. The computer-implemented method of claim 1, wherein the link is associated with an identifier of an application, and wherein providing a representation of the server folder to the second client comprises:
   determining the application based on the identifier; and creating a representation of the server folder using the application.

12. A non-transitory computer-readable storage medium having executable computer program instructions embodied therein that when executed by a server perform actions comprising:
   providing to a first client a user interface comprising a representation of a server folder, and a user interface element representing a request for a link providing access to the server folder;
   responsive to a user of the first client selecting the user interface element, generating a link specifying the server folder providing the link to the first client for distribution by the user to other clients;
      receiving, from a second client located remotely from the first client, a first access request via the link;
      responsive to receiving the first access request, providing a first representation of the server folder to the second client, the first representation including the first plurality of files;
      receiving a request to synchronize with the server folder a set of client files stored in a client folder, the set of client files including a plurality of new client files not stored in the server folder;
      synchronizing the server folder with the client folder, the synchronizing comprising creating a plurality of new server files in the server folder that correspond to the plurality of new client files;
      receiving, from the second client, after the synchronizing, a second access request via the link; and
      responsive to receiving the second access request, providing a second representation of the server folder to the second client, the second representation including the plurality of new server files, the first representation omitting the plurality of new server files.

13. The non-transitory computer-readable storage medium of claim 12, the actions further comprising:
   receiving, from the first client, a request for a list of the links that have been generated by the user; and
   providing the first client with the list of links.

14. The non-transitory computer-readable storage medium of claim 12, the actions further comprising:
   responsive to receiving from the first client a request to remove the link, removing the link;
   receiving a second access request from the second client via the link; and
   responsive to the removing of the link, denying access to the server folder.

15. The non-transitory computer-readable storage medium of claim 12, the actions further comprising:
   providing to the first client a user interface comprising a user interface element representing transmitting the link to a social networking service; and
   responsive to selection of the user interface element, transmitting the link for sharing with a user of the second client via the social networking service using an API of the social networking service.

16. A file access server comprising:
   a computer processor; and
      a computer-readable medium storing a computer program executable by the computer processor and performing actions comprising:
         providing to a first client a user interface comprising a representation of a server folder, and a user interface element representing a request for a link providing access to the server folder;
         responsive to a user of the first client selecting the user interface element, generating a link specifying the server folder providing the link to the first client for distribution by the user to other clients;
         receiving, from a second client located remotely from the first client, a first access request via the link;
         responsive to receiving the first access request, providing a first representation of the server folder to the second client, the first representation including the first plurality of files;
         receiving, by the file access server from the first client, a request to synchronize with the server folder a set of client files stored in a client folder, the set of client files including a plurality of new client files not stored in the server folder;
         synchronizing, by the file access server, the server folder with the client folder, the synchronizing comprising creating a plurality of new server files in the server folder that correspond to the plurality of new client files;
         receiving, from the second client, after the synchronizing, a second access request via the link; and
         responsive to receiving the second access request, providing a second representation of the server folder to the second client, the second representation including the plurality of new server files, the first representation omitting the plurality of new server files.

17. The computer server of claim 16, the actions further comprising:
   receiving, from the first client, a request for a list of the links that have been generated by user; and
   providing the first client with the list of links.

18. The computer server of claim 16, the actions further comprising:
   responsive to receiving from the first client a request to remove the link, removing the link;
   receiving a third access request from the second client via the link; and
   responsive to the removing of the link, denying access to the server folder.

19. A method comprising:
   receiving, by a file access server from a first client device, a folder including a plurality of files;
   synchronizing, by the file access server, the folder and the included plurality of files with the first client device and a second client device;
   receiving, by the file access server from the first client device, a request for a uniform resource locator (URL) associated with the folder;
   generating, by the file access server, a URL associated with the folder;
   providing, by the file access server, the URL to the first client device for distribution to other client devices by a user of the first client device;
   synchronizing, by the file access server, an addition of a file to the folder by the second client device;
   receiving, from a requestor other than one of the synchronized first client device or second client device, a request for the folder via the URL; and
   providing contents of the folder to the requestor, the contents including the plurality of files and the added file.

20. A computer-implemented method executed by a file access server, comprising:

registering, to a first user by the file access server, a plurality of client devices associated with the first user, the plurality of client devices comprising a first client device;

storing, by the file access server, a server folder containing a plurality of server copies of files;

providing to the first client device a user interface comprising a representation of the plurality of server copies of files in the server folder, and a user interface element representing a request for a link providing access to the server folder;

responsive to the first user selecting the user interface element, generating a uniform resource locator (URL) specifying the server folder providing the URL to the first client device for distribution by the user to other client devices;

receiving, from one of the plurality of client devices of the first user, a request to synchronize with the file access server a client folder corresponding to the server folder, the client folder containing an additional file not contained in the server folder;

synchronizing, by the file access server, the server folder with the client folder, the synchronizing comprising copying the additional file to the server folder;

identifying, by the file access server, other client devices of the plurality of client devices registered to the first user, other than the first client device;

synchronizing, by the file access server, the server folder of the first file with the other client devices, the synchronizing comprising copying the additional file from the server folder to the other client devices;

receiving, from a second user on a second client device located remotely from the server, an access request via the URL; and responsive to receiving the access request, providing a representation of the plurality of server copies of files in the server folder and of the additional file to the second client device.

21. The computer-implemented method of claim 20, wherein generating the URL specifying the server folder comprises:

receiving indicia of a user identifier of the second user;

sending the URL to the second user using the user identifier.

22. The computer-implemented method of claim 20, further comprising sending the URL to a system remote from the file access server.

\* \* \* \* \*